United States Patent
Panagos et al.

(10) Patent No.: US 7,134,685 B2
(45) Date of Patent: Nov. 14, 2006

(54) AIR BAG DEPLOYMENT ARRANGEMENT

(75) Inventors: Bill C. Panagos, Grosse Pointe, MI (US); Steven A. Schulte, Novi, MI (US)

(73) Assignee: Lear Corporation, Southfield, MI (US)

( * ) Notice: Subject to any disclaimer, the term of this patent is extended or adjusted under 35 U.S.C. 154(b) by 286 days.

(21) Appl. No.: 10/758,910

(22) Filed: Jan. 16, 2004

(65) Prior Publication Data

US 2005/0156412 A1    Jul. 21, 2005

(51) Int. Cl.
*B60R 21/207*   (2006.01)
*B60R 21/215*   (2006.01)

(52) U.S. Cl. .................... 280/730.2; 280/728.3; 280/728.2

(58) Field of Classification Search ........... 280/728.2, 280/728.3, 730.2
See application file for complete search history.

(56) References Cited

U.S. PATENT DOCUMENTS

| | | | |
|---|---|---|---|
| 4,740,035 A | 4/1988 | Kazaoka et al. | |
| 5,112,079 A | 5/1992 | Haland et al. | |
| 5,222,761 A | 6/1993 | Kaji et al. | |
| 5,251,931 A | 10/1993 | Semchena et al. | |
| 5,348,342 A | 9/1994 | Haland et al. | |
| 5,498,030 A | 3/1996 | Hill et al. | |
| 5,630,615 A | 5/1997 | Miesik | |
| 5,651,582 A | 7/1997 | Nakano | |
| 5,678,853 A | 10/1997 | Maly | |
| 5,749,597 A | 5/1998 | Saderholm | |
| 5,762,363 A | 6/1998 | Brown et al. | |
| 5,816,610 A | 10/1998 | Higashiura et al. | |
| 5,826,939 A | 10/1998 | Beyer | |
| 5,860,673 A | 1/1999 | Hasegawa et al. | |
| 5,863,063 A | 1/1999 | Harrell | |
| 5,893,579 A | 4/1999 | Kimura et al. | |
| 5,927,749 A | 7/1999 | Homier et al. | |
| 5,938,232 A | 8/1999 | Kalandek et al. | |
| 5,967,546 A | 10/1999 | Homier et al. | |
| 5,967,603 A | 10/1999 | Genders et al. | |
| 6,045,151 A | 4/2000 | Wu | |
| 6,074,003 A | 6/2000 | Umezawa et al. | |
| 6,206,410 B1 * | 3/2001 | Brown | 280/728.3 |
| 6,237,934 B1 | 5/2001 | Harrell et al. | |
| 6,254,122 B1 | 7/2001 | Wu et al. | |
| 6,293,580 B1 * | 9/2001 | Lachat et al. | 280/728.3 |
| 6,357,789 B1 | 3/2002 | Harada et al. | |

(Continued)

FOREIGN PATENT DOCUMENTS

EP    1 400 415 A3    3/2004

(Continued)

*Primary Examiner*—Paul N. Dickson
*Assistant Examiner*—George D Spisich
(74) *Attorney, Agent, or Firm*—Brooks Kushman P.C.

(57) ABSTRACT

An assembly for a vehicle seat includes an air bag module having an inflatable air bag, and a trim cover that covers at least a portion of the air bag module. The trim cover further has a deployment seam for allowing the air bag to deploy through the trim cover. The assembly also includes an air bag deployment member for guiding deployment of the air bag, and the deployment member has first and second sections. The first section is connected to the trim cover and extends toward a first side of the air bag module. The second section is connected to the first section at a location proximate the trim cover and extends toward a second side of the air bag module. Furthermore, the second section of the deployment member is not connected directly to the trim cover, and the deployment member is connected to the trim cover on only one side of the deployment seam.

24 Claims, 3 Drawing Sheets

U.S. PATENT DOCUMENTS

| | | |
|---|---|---|
| 6,382,665 B1 * | 5/2002 | Holdampf et al. ....... 280/730.2 |
| 6,439,597 B1 * | 8/2002 | Harada et al. ........... 280/728.2 |
| 6,450,528 B1 | 9/2002 | Suezawa et al. |
| 6,578,911 B1 | 6/2003 | Harada et al. |
| 6,588,838 B1 | 7/2003 | Dick, Jr. et al. |
| 2004/0130130 A1 | 7/2004 | Bossecker et al. |

FOREIGN PATENT DOCUMENTS

| WO | WO 00/06426 | 2/2000 |
|---|---|---|

* cited by examiner

AIR BAG DEPLOYMENT ARRANGEMENT

BACKGROUND OF THE INVENTION

1. Field of the Invention

The invention relates to an air bag deployment arrangement for a vehicle seat.

2. Background Art

Motor vehicle seats may be provided with an inflatable air bag that deploys through a trim cover. Examples of such seats are disclosed in U.S. Pat. Nos. 6,045,151 and 6,237,934.

SUMMARY OF THE INVENTION

An assembly according to the invention for use with a vehicle seat includes an air bag module having an inflatable air bag, and a trim cover that covers at least a portion of the air bag module. The trim cover further has a deployment seam for allowing the air bag to deploy through the trim cover. In addition, the assembly includes an air bag deployment member for guiding deployment of the air bag, and the deployment member has first and second sections. The first section is connected to the trim cover and extends toward a first side of the air bag module. The second section is connected to the first section at a location proximate the trim cover and extends toward a second side of the air bag module. Furthermore, the second section of the deployment member is not connected directly to the trim cover, and the deployment member is connected to the trim cover on only one side of the deployment seam.

Further under the invention, a vehicle seat cushion assembly includes a frame and an air bag module supported by the frame. The air bag module includes an inflatable air bag, and an inflator for inflating the air bag. A trim cover covers at least a portion of the air bag module, and the trim cover has a deployment seam for allowing the air bag to deploy through the trim cover. The assembly further includes an air bag deployment band for guiding deployment of the air bag. The deployment band substantially circumscribes the air bag module and has first and second ends. The first end is connected to the trim cover on one side of the deployment seam, and the second end is connected to a portion of the deployment band proximate the first end.

Still further under the invention, an assembly for a vehicle seat includes an air bag module including an inflatable air bag, and a trim cover that covers at least a portion of the air bag module. The assembly further includes an air bag deployment device for guiding deployment of the air bag, and the deployment device has first and second sections. The first section is connected to the trim cover and extends toward a first side of the air bag module. The second section is connected to the first section at a location proximate the trim cover and extends toward a second side of the air bag module.

While exemplary cushion assemblies in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2b is an enlarged view of a portion of FIG. 2a;

FIG. 3b is an enlarged view of a portion of FIG. 3a.

DETAILED DESCRIPTION OF THE PREFERRED EMBODIMENT(S)

Figure 1:
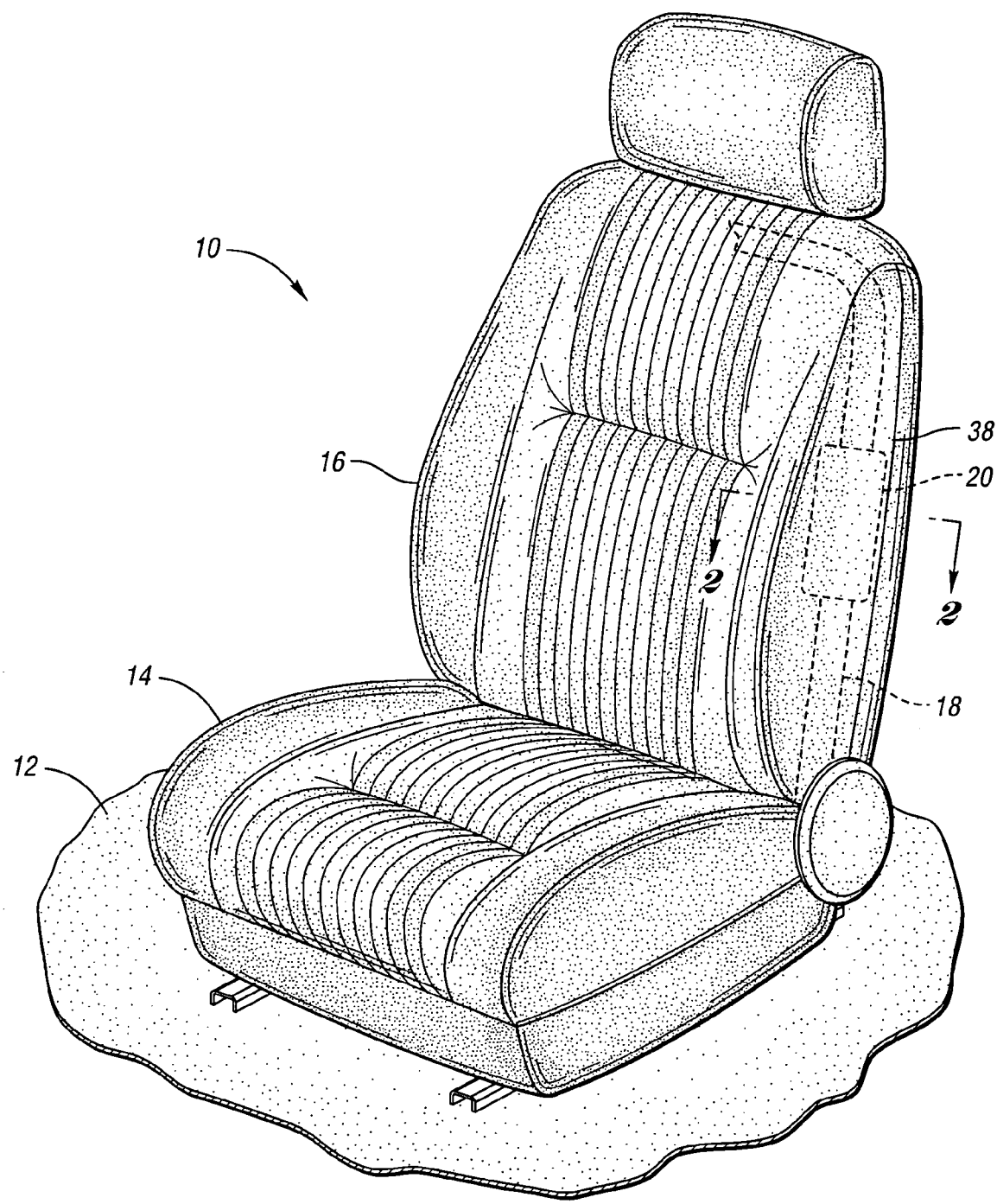
FIG. 1 is a perspective view of a vehicle seat according to the invention.

FIG. 1 shows a vehicle seat 10 according to the invention mounted in a motor vehicle 12. The seat 10 includes a lower seat cushion assembly 14 and a seat back cushion assembly 16 attached to the lower seat cushion assembly 14, such as by one or more recliner mechanisms.

Figure 2A:
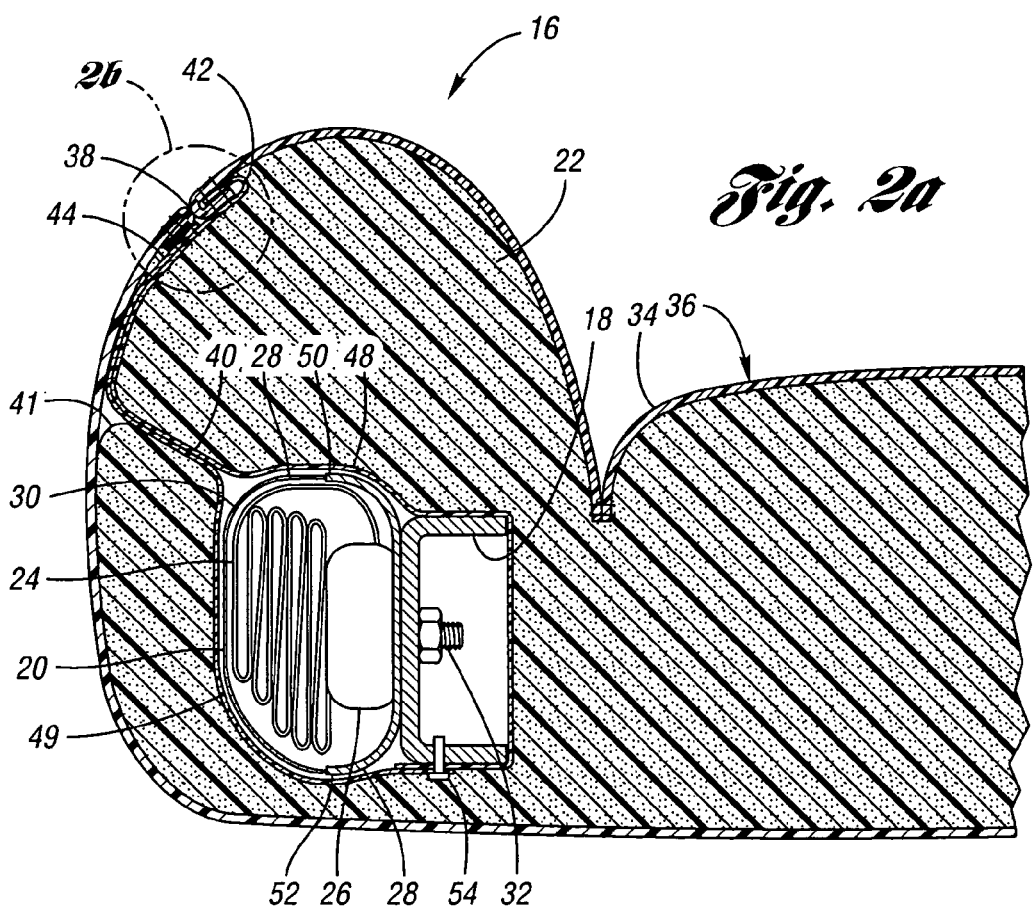
FIG. 2a is a cross-sectional view of the vehicle seat taken along line 2—2 in FIG. 1.

Referring to FIGS. 1 and 2a, the seat back cushion assembly 16 includes a seat back frame 18, an air bag module 20 supported by the frame 18, and padding 22 such as foam disposed adjacent the frame 18 and/or air bag module 20. While the air bag module 20 may have any suitable configuration, in the embodiment shown in FIG. 2a, the air bag module 20 includes an inflatable air bag 24, an inflator 26 connected to the air bag 24 for inflating the air bag 24, and a housing 28 that receives the inflator 26. The air bag module 20 may also include a covering member 30, such as fabric or plastic, that at least partially covers the air bag 24 to retain the air bag 24 in a folded condition. Moreover, the inflator 26 and/or housing 28 may be connected to the frame 18 and/or a bracket (not shown) in any suitable manner, such as with one or more fasteners 32.

As another example, the housing 28 may be configured to substantially enclose the air bag 24 and inflator 26. For instance, the housing 28 may have a clam-shell body that surrounds the air bag 24 and inflator 26, and that is configured to open upon inflation of the air bag 24.

The seat back cushion assembly 16 further includes a trim cover 34 that covers at least a portion of the air bag module 20 and that defines an appearance surface 36 of the seat back cushion assembly 16. The trim cover 34 may comprise any suitable cover material, such as fabric, vinyl and/or leather, and may also include a padding layer attached to the cover material. Furthermore, in the embodiment shown in FIGS. 2a and 2b, the trim cover 34 includes a deployment seam 38 for allowing the air bag 24 to deploy through the trim cover 34. The deployment seam 38 may be formed, for example, by joining two portions of the trim cover 34 together with breakable stitching or thread.

In addition, the seat back cushion assembly 16 includes an air bag deployment member or device 40 for guiding deployment of the air bag 24. While the deployment device 40 may have any suitable configuration, in the embodiment shown in FIG. 2a, the deployment device 40 includes a flexible band that circumscribes the air bag module 20 and extends through an opening 41 in padding 22 toward trim cover 34. As shown in FIG. 2a, the deployment device 40 may also surround at least a portion of the frame 18. Moreover, the deployment device 40 may comprise any suitable material and have any suitable size. For example, the deployment device 40 may comprise fabric and/or plastic, and may have a width in the range of 2 to 20 centimeters.

Figure 2B:
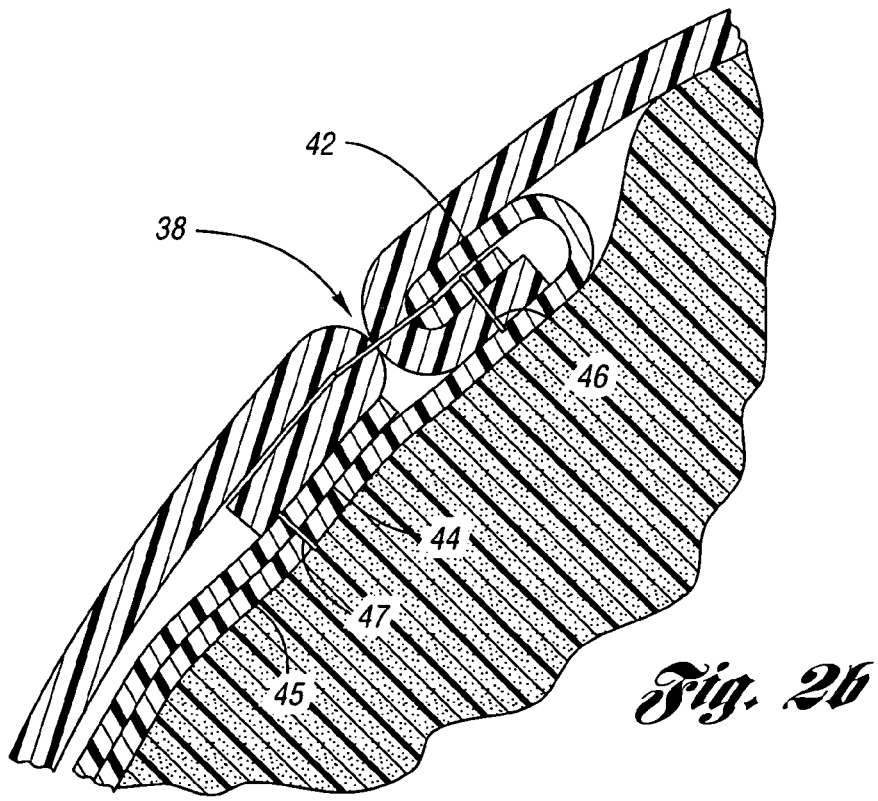

Referring to FIGS. 2a and 2b, the deployment device 40 may be connected to the trim cover 34 only on one side of the deployment seam 38. For example, the deployment device 40 may have a first end 42 connected to the trim cover 34 on an inboard side of the deployment seam 38, and a second end 44 directly and releasably connected to a portion 45 of the deployment device 40 proximate the first end 42.

As a result, the deployment device 40 may be configured such that the second end 44 is not connected directly to the trim cover 34. While the deployment device 40 may be connected to the trim cover 34 and to itself in any suitable manner, in the embodiment shown in FIGS. 2a and 2b, the first end 42 is sewn to the trim cover 34 with stitching or thread 46, and the second end 44 is sewn to the portion 45 with rupturable stitching or thread 47.

Alternatively, the deployment device 40 may be connected to the trim cover 34 on an outboard side of the deployment seam 38. For example, the second end 44 may be sewn or otherwise connected to the trim cover 34 proximate the deployment seam 38, and the first end 42 may be sewn or otherwise connected to a portion of the deployment device 40 proximate the second end 42, such that the first end 42 is not directly connected to the trim cover 34.

Moreover, the deployment device 40 may be of a single piece construction, or the deployment device 40 may comprise multiple portions or sections that are connected together, such as with fasteners, adhesive, thread, hook and loop fastening systems and/or zippers. For example, the deployment device 40 may include first and second portions or sections 48 and 49, respectively, that extend along first and second sides 50 and 52, respectively, of the air bag module 20. In the embodiment shown in FIG. 2a, the sections 48 and 49 are connected together and to the frame 18 with one or more fasteners 54, such as push pin fasteners. As another example, the first and second sections 48 and 49 may be joined together by capturing the sections 48 and 49 between the frame 18 and the air bag module 20, such that the deployment device 40 does not surround the frame 18.

With the configuration described above, the deployment device 40 directs the air bag 24 toward the deployment seam 38 upon inflation of the air bag 24. When the air bag 24 is sufficiently close to the deployment seam 38, the thread 47 or other connection means breaks or otherwise releases to allow the ends 42 and 44 of the deployment device 40 to separate, thereby allowing the air bag 24 to rupture the deployment seam 38. Advantageously, deployment seam rupture times of less than 5 milliseconds may be achieved with this configuration.

Alternatively or supplementally, the lower seat cushion assembly 14 may have a similar configuration as described above with respect to the seat back cushion assembly 16. More specifically, the lower seat cushion assembly 14 may be provided with an air bag module 20 and deployment device 40.

Figure 3A:
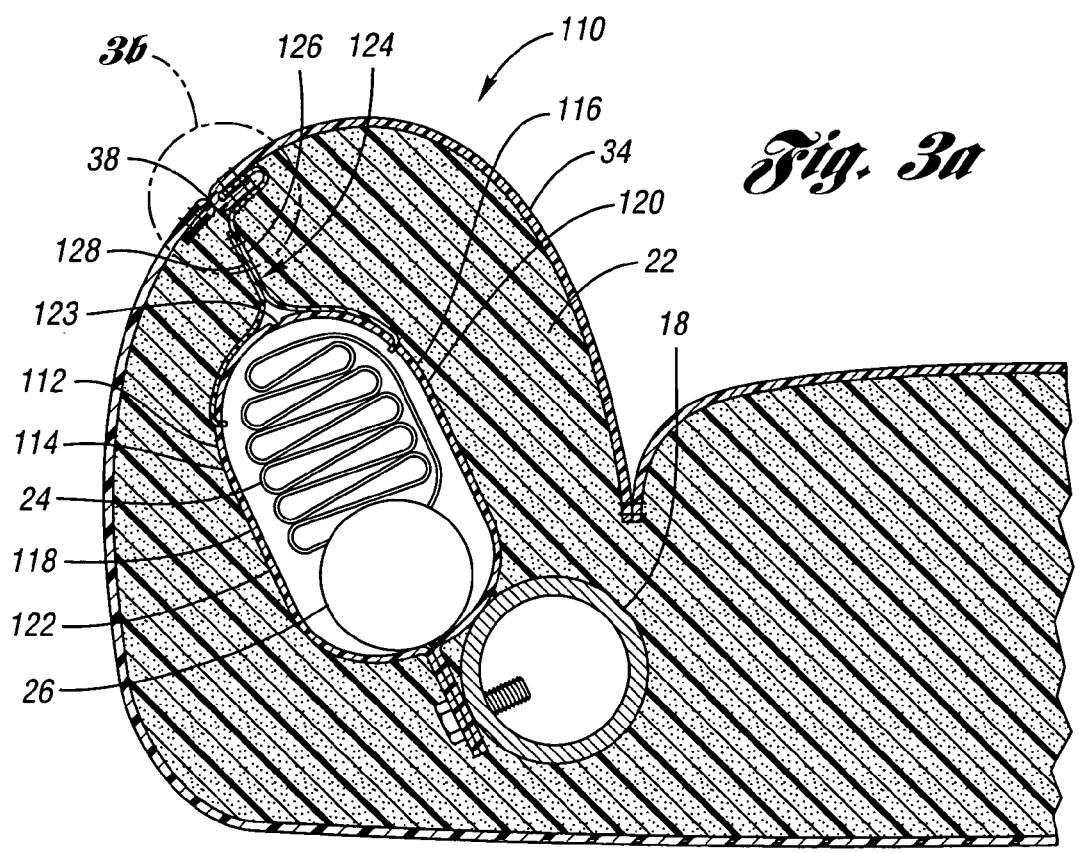
FIG. 3a is a cross-sectional view similar to FIG. 2a of a second embodiment of a vehicle seat according to the invention.
Figure 3B:
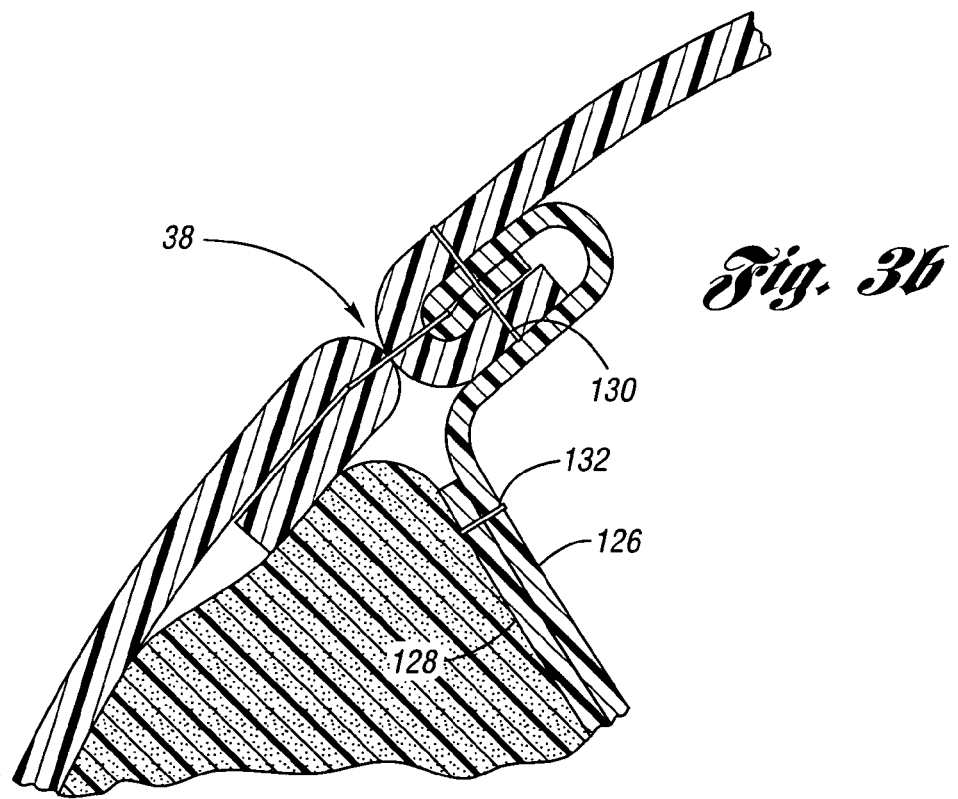

FIGS. 3a and 3b show a second embodiment 110 of a vehicle seat cushion assembly, such as a lower seat cushion assembly or a seat back cushion assembly, according to the invention. Similar components of the seat back cushion assembly 16 and cushion assembly 110 are identified with the same reference numerals.

The cushion assembly 110 includes an air bag module 112 having a housing 114 that surrounds air bag 24 and inflator 26. The housing 114 may be made of any suitable material, such as plastic, and includes first and second housing portions 116 and 118, respectively, that define first and second sides 120 and 122, respectively, of the air bag module 112. In addition, the housing portions 116 and 118 may be joined together by a rupturable portion 123, such as a frangible groove or seam. The housing portions 116 and 118 are configured to separate at the rupturable portion and move away from each other upon inflation of the air bag 24.

The cushion assembly 110 further includes an air bag deployment member or device 124 for guiding deployment of the air bag 24. The deployment device 124 includes first and second flexible sections 126 and 128, respectively, that are connected to the first and second housing portions 116 and 118, respectively, in any suitable manner. For example, the sections 126 and 128 may be connected to the housing portions 116 and 118 using fasteners and/or adhesive. In one embodiment of the invention, each section 126 and 128 may be provided with a first engaging member, such as a hook, that engages a second engaging member, such as an aperture or recess, formed in a respective housing portion 116 and 118.

Alternatively, one or both sections 126 and 128 may be connected to any other suitable component. For example, one or both sections 126 and 128 may be connected directly to seat frame 18, or to a bracket that is supported by frame 18.

In addition, the first section 126 is sewn or otherwise connected to the trim cover 34 on one side of the deployment seam 38, and the second section 128 is sewn or otherwise releasably connected directly to the first section 126 at a location proximate the trim cover 34. For example, the first section 126 may be connected to the trim cover 34 with stitching or thread 130, and the second section 128 may be connected to the first section with breakable stitching or thread 132. Furthermore, in the embodiment shown in FIGS. 3a and 3b, the second section 128 is not connected directly to the trim cover 34. Although FIGS. 3a and 3b show the first section 126 connected to the inboard side of deployment seam 38, the deployment device 124 may instead be connected to the outboard side of deployment seam 38.

Upon inflation of the air bag 24, the housing portions 116 and 118 separate and allow the air bag 24 to pass between the sections 126 and 128 of the deployment device 124. The deployment device 124 directs the air bag 24 toward the deployment seam 38, such that when the air bag 24 is sufficiently close to the deployment seam 38, the connection between the sections 126 and 128 breaks or otherwise releases. As a result, the sections 126 and 128 separate and allow the air bag 24 to rupture the deployment seam 38.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An assembly for a vehicle seat comprising:
an air bag module including an inflatable air bag;
a trim cover that covers at least a portion of the air bag module, the trim cover having a deployment seam for allowing the air bag to deploy through the trim cover; and
an air bag deployment member for guiding deployment of the air bag, the deployment member having first and second sections, the first section being connected to the trim cover at a first connection location and extending toward a first side of the air bag module, the second section being connected to the first section at a second connection location proximate the trim cover and extending toward a second side of the air bag module, wherein the second section of the deployment member is not connected directly to the trim cover and the deployment member is connected to the trim cover on only one side of the deployment seam, and wherein the second connection location is spaced away from the first connection location.

2. The assembly of claim 1 wherein the deployment member substantially circumscribes the air bag module.

3. The assembly of claim 2 wherein the deployment member comprises a one piece band that circumscribes the air bag module.

4. The assembly of claim 2 wherein the deployment member comprises multiple pieces that are connected together such that the deployment member circumscribes the air bag module.

5. The assembly of claim 1 further comprising a frame for supporting the air bag module, and wherein the deployment member at least partially surrounds the frame.

6. The assembly of claim 1 wherein the air bag module further includes an inflator for inflating the air bag, and a housing that substantially surrounds the air bag and the inflator.

7. The assembly of claim 1 wherein the air bag module further includes an inflator for inflating the air bag, and a covering member that at least partially surrounds the air bag.

8. The assembly of claim 1 wherein the deployment member is configured to allow the second section to disconnect from the first section upon inflation of the air bag, to thereby allow the air bag to deploy though the deployment seam.

9. The assembly of claim 1 wherein the first section of the deployment member has a first end connected to the trim cover, and the second section of the deployment member has a second end connected to the first section proximate the first end, and wherein the second end is spaced away from the trim cover and is configured to separate from the first section upon inflation of the air bag.

10. The assembly of claim 1 wherein the second section of the deployment member contacts the trim cover, and wherein the deployment member is configured to allow the second section to disconnect from the first section upon inflation of the air bag, to thereby allow the air bag to deploy through the deployment seam.

11. The assembly of claim 1 wherein the air bag module further includes a housing that at least partially surrounds the air bag, the housing including first and second housing portions that are movable away from each other upon inflation of the air bag, and wherein the first section of the deployment device has an end connected to the first housing portion, the second section of the deployment device has an end connected to the second housing portion, and the end of the first section is spaced away from the end of the second section.

12. A cushion assembly for a vehicle seat comprising:
a frame;
an air bag module supported by the frame, the air bag module including an inflatable air bag, and an inflator for inflating the air bag;
a trim cover that covers at least a portion of the air bag module, the trim cover having a deployment seam for allowing the air bag to deploy through the trim cover; and
an air bag deployment band for guiding deployment of the air bag, the deployment band substantially circumscribing the air bag module, the deployment band further having first and second ends, the first end being connected to the trim cover on one side of the deployment seam at a first connection location, and the second end being connected to a portion of the deployment band proximate the first end at a second connection location spaced away from the first connection location, wherein the second end of the deployment band is not connected directly to the trim cover and the deployment band is connected to the trim cover on only one side of the deployment seam, and wherein the deployment band is configured to allow the second end to separate from the portion of the deployment band proximate the first end upon inflation of the air bag, to thereby allow the air bag to deploy through the deployment seam.

13. The assembly of claim 12 wherein the deployment band includes a single piece band body that extends from the first end to the second end.

14. The assembly of claim 8 wherein the deployment band comprises multiple pieces that are connected together.

15. The assembly of claim 12 wherein the second end of the deployment band is spaced away from the trim cover.

16. The assembly of claim 12 wherein the second end of the deployment band contacts the trim cover.

17. An assembly for a vehicle seat comprising:
an air bag module including an inflatable air bag;
a trim cover covering at least a portion of the air bag module; and
an air bag deployment device for guiding deployment of the air bag, the deployment device having first and second sections, the first section being connected to the trim cover at a first connection location and extending toward a first side of the air bag module, the second section being connected to the first section at a second connection location proximate the trim cover and extending toward a second side of the air bag module, the second connection location being spaced away from the first connection location, wherein the second section is not connected directly to the trim cover, and wherein the deployment device is configured to allow the second section to disconnect from the first section upon inflation of the air bag.

18. The assembly of claim 17 wherein the air bag module further includes a housing that at least partially surrounds the air bag, the housing including first and second housing portions that are movable away from each other upon inflation of the air bag, and wherein the first section of the deployment device has an end connected to the first housing portion, the second section of the deployment device has an end connected to the second housing portion, and the end of the first section is spaced away from the end of the second section.

19. The assembly of claim 17 wherein the first and second sections of the deployment device cooperate to substantially surround the air bag module.

20. The assembly of claim 17 wherein the trim cover has a deployment seam for allowing the air bag to deploy though the trim cover, and wherein the first section of the deployment device is connected to the trim cover on one side of the deployment seam.

21. The assembly of claim 17 further comprising a frame for supporting the air bag module, and wherein at least one of the sections of the deployment device is connected to the frame.

22. The assembly of claim 17 wherein the first section of the deployment device has a first end connected to the trim cover, and the second section of the deployment device has a second end connected to a portion of the first section, and wherein the second end is spaced away from the trim cover.

23. The assembly of claim 17 wherein the second section of the deployment device contacts the trim cover.

24. An assembly for a vehicle seat comprising:
an air bag module including an inflatable air bag;
a trim cover covering at least a portion of the air bag module; and an air bag deployment device for guiding deployment of the air bag, the deployment device having first and second sections, the first section being connected to the trim cover and extending toward a first side of the air bag module, the second section being connected to the first section at a location proximate the trim cover and extending toward a second side of the air bag module, wherein the second section is not connected directly to the trim cover, and wherein the deployment device is configured to allow the second section to disconnect from the first section upon inflation of the air bag; wherein the air bag module further includes a housing that at least partially surrounds the air bag, the housing including first and second housing portions, and wherein the first section of the deployment device has an end connected to the first housing portion, the second section of the deployment device has an end connected to the second housing portion, and the end of the first section is spaced away from the end of the second section.

* * * * *